United States Patent Office 2,760,598
Patented Aug. 28, 1956

2,760,598

GAS SORBENT AND METHOD OF GAS RECOVERY AND STORAGE

Frederick C. Dietz, Lafayette, and Robert C. Thorburn, Palo Alto, Calif., assignors, by mesne assignments, to the United States of America as represented by the United States Atomic Energy Commission No Drawing. Application February 16, 1955, Serial No. 488,737

11 Claims. (Cl. 183—114.2)

This invention relates to a process for the recovery and storage of certain gaseous materials and to sorbent mixtures used therefor. More particularly, the invention is directed to such a method whereby monatomic gases and halides are readily accumulated on a suspension of a suitable particulate sorbent in a liquefied gas medium.

In the past, various methods of sorption have been known and used for the collection of fluids by solid materials. These methods range from simple mechanical absorption of the fluid in an expansive, reticulate structure such as the common sponge to irreversible chemisorption involving formation, with the sorbent, of chemical compounds as in the sorption of oxygen on tungsten. Due to the dispersed nature of the molecular constituents of gases, special problems are encountered in their collection and sorption. Present methods in use depend principally upon the direct sorption of the gases on certain solids which are generally extremely porous lattice structures such as chars, activated carbons, and silicates.

The recovery of monatomic gases is especially difficult. Due to the complete electron shells of these elements, these gases exhibit certain physical characteristics which do not lend themselves to sorption by other media. Therefore monatomic gas sorption requires the use of special techniques and skill.

Now there has been discovered an inexpensive, efficient method for the recovery of monatomic and other gases. This method is based upon the steps of immersing a desired quantity of particulate sorbent material in a liquefied gas, passing the gas to be sorbed into the sorbent suspension, and slowly evaporating the liquefied gas. In this manner the sorbed gases are deposited on and in the solid sorbent in a concentrated form and with quantitative recovery.

It is therefore a principal object of the present invention to provide an efficient method for the recovery of gases.

It is a further object of the invention to provide such a method wherein said gases are sorbed on a sorbent material such as activated carbon, charcoal, or silica gel.

Another object of the invention is to provide an economical and efficient means for the recovery of monatomic gases.

An additional object of the invention is to provide a method of gas sorption in which final recovery of the gases is affected in a dry medium.

Yet another object of the present invention is a simple, direct method of recovery of radioactive gaseous material.

Still another feature of the invention is the recovery, in a concentrated form, of gases on solid materials.

Other objects of the invention will become readily apparent from a consideration of the following description of the sorbent and method taken in conjunction with the accompanying claims.

In the practice of the present invention, a quantity of a particulate sorbent is immersed or suspended in a suitable quantity of a liquid medium. Appropriate media include substances which are aeriform at standard pressure and normal room temperature and which have been liquefied by high pressure or other means. Such suitable media, for example, include liquid air, hydrogen, or nitrogen. Particulate sorbents which may be effectively used in the process include activated carbon, charcoal, and silica gel. The sorbents and liquefied gas media are not limited to those examples cited above; other alternatives exist and the medium may be varied according to the application. These alternatives will be readily obvious to one skilled in the art.

When the slurry or suspension has been prepared, as above, the gas is passed thereinto in such a manner as to uniformly diffuse therethrough. Removal of the gas is readily achieved by sorption on the relatively large internal and external surfaces of the solid sorbent and through solution by intermolecular diffusion in the liquid phase. Sorption in said phase is dependent upon the solubility constant of the gas in the liquid and proceeds until an equilibrium is reached between the gas and the liquid phase. On evaporation of the liquefied gas solvent, the sorbed gases concentrate on the solid sorbent surfaces.

The system as herein described takes advantage of a number of favorable factors which are so integrated as to result in very efficient sorption of the gaseous phases. Primarily, the permeable nature of the sorbents provides an extensive area for sorption of these gases. The solid sorbents cited are well known for their efficiency in this type of sorption. In addition, sorption of the gases in the liquid phase contributes indirectly to the final sorption through intermediate sorption of the gas prior to the transfer of the sorbed gas to the solid sorbent. In this manner, by gradual evaporation of the liquid phase, transfer therefrom of effectively all of the sorbed gases to the solid sorbent is accomplished. Since the sorption is inversely proportional to the temperature of the system, the use of liquefied gas solvents, such as liquid nitrogen, for the liquid component offers a further advantage. Accelerated and more complete sorption is achieved at the extremely low boiling temperatures, i. e., less than $-180°$ centigrade, of these liquefied gases. Further efficiency is achieved for this process by the suspension of the solid sorbent directly in the liquid assuring optimum interphase contact for effective sorption and transfer.

The method, as to its operation, may be more clearly understood from a consideration of the following illustrative example:

*Example*

A sorbent suspension medium was prepared by adding 100 ml. of "Pittsburgh" type BP activated carbon, 4 to 10 mesh, to ca. 500 ml. of liquid nitrogen. A sample consisting of 830 ml. of waste radioactive gases from a water boiler nuclear fission reactor, said gases having a disintegration rate of $1.4 \times 10^7$ disintegrations per minute per milliliter as measured with a standard gamma ray counter, were passed into the carbon-nitrogen suspension. Effluent gas from the trap showed a count of less than 1.5 times background. The liquid nitrogen was evaporated over a 48 hour period with negligible activity indicated in the released gases. After 48 hours, air was drawn over the activated carbon granules, picking up an activity of about 50,000 disintegration per minute per milliliter, and demonstrating that substantially all of the original activity of the water boiler reactor fission product gases was transferred to the carbon. This transfer was accomplished both during the original bubbling of the gas through the carbon-liquefied nitrogen mixture, and during the subsequent slow evaporation of the nitrogen from the mixture.

As is illustrated above, the subject process finds special application for the storage or disposal of radioactive gases. Due to the compact, concentrated, final form of the sorbed gas on the solid sorbent, a minimum of storage or disposal space is necessary. Gaseous wastes formerly were dissolved in water or another similar solvent and stored as liquids, requiring large tanks and storage areas. With the present process the concentrated form of the gas on the solid sorbent allows for maximum storage efficiency.

Several advantages are offered by the subject process over prior processes. For example, in this process the intimate dispersion of the final solid sorbent in the intermediate liquid sorbent insures maximum efficiency of recovery. Moreover, in this process recovery of the gases is achieved in one step, with the sorbent medium in one container, as opposed to a multistep process having a sequence of liquid and solid gas traps. In addition, the gases are deposited in a very concentrated form on the solid sorbent upon evaporation of the liquid.

While there has been described above the operation of the subject method as illustrated by the example thereof, it is not intended that the invention be limited to the described embodiment, but that rights patent be granted for all similar alternatives as may fall within the scope of the appended claims.

What is claimed is:

1. A method of recovering monatomic and halide gases from reactor wastes and the like comprising contacting said gases with a sorbent mixture consisting of a solid particulate sorbent suspended in a liquefied gas, storing the sorbent mixture at a temperature above the boiling point of the liquefied gas to insure evaporation of said gas, and collecting the residual sorbent retaining substantially all of the subject gases to be recovered.

2. The method essentially as described in claim 1 wherein the liquefied gas is one chosen from the group consisting of liquid hydrogen, liquid nitrogen, and liquid air.

3. The method essentially as described in claim 1 wherein the particulate sorbent is one chosen from the group consisting of activated carbon, charcoal, and silica gel.

4. A method for the recovery of radioactive gases comprising contacting said gases with a sorbent mixture consisting of a particulate sorbent chosen from the group consisting of activated carbon, charcoal, and silica gel suspended in a liquid vehicle chosen from the group consisting of liquefied hydrogen, liquefied nitrogen, and liquefied air, storing the mixture at a temperature above the boiling point of the vehicle until complete evaporation of the vehicle is accomplished, and collecting the residual sorbent retaining substantially all of the radioactive gases.

5. A method for the recovery of monatomic and halide gases in a concentrated form on a solid medium, said method comprising contacting said gases with a sorbent mixture consisting of a solid particulate sorbent suspended in a liquefied gas vehicle, storing said mixture at a temperature above the boiling point of the vehicle until complete evaporation of the vehicle is accomplished, and collecting the residual sorbent retaining substantially all of the subject gases.

6. The method as described in claim 4 but wherein said liquid vehicle is liquefied air.

7. The method as described in claim 4 but wherein said liquid vehicle is liquefied nitrogen.

8. The method as described in claim 4 but wherein said liquid vehicle is liquefied hydrogen.

9. The method as described in claim 4 but wherein said particulate sorbent is silica gel.

10. The method as described in claim 4 but wherein said particulate sorbent is charcoal.

11. The method as described in claim 4 but wherein said particulate sorbent is activated carbon.

References Cited in the file of this patent

UNITED STATES PATENTS 2,668,425  Skaperdas _____ Feb. 9, 1954